United States Patent
Papasakellariou et al.

(10) Patent No.: US 9,918,301 B2
(45) Date of Patent: *Mar. 13, 2018

(54) TRANSMISSION OF ACKNOWLEDGEMENT SIGNALS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 134 days.

This patent is subject to a terminal disclaimer.

(21) Appl. No.: 14/810,198

(22) Filed: Jul. 27, 2015

(65) Prior Publication Data

US 2015/0333872 A1    Nov. 19, 2015

Related U.S. Application Data

(63) Continuation of application No. 14/011,448, filed on Aug. 27, 2013, now Pat. No. 9,094,964, which is a continuation of application No. 12/684,419, filed on Jan. 8, 2010, now Pat. No. 8,522,105.

(60) Provisional application No. 61/153,069, filed on Feb. 17, 2009.

(51) Int. Cl.
| | |
|---|---|
| *H04J 3/16* | (2006.01) |
| *H04J 11/00* | (2006.01) |
| *H04W 72/04* | (2009.01) |
| *H04L 1/16* | (2006.01) |
| *H04L 5/00* | (2006.01) |
| *H04L 1/18* | (2006.01) |
| *H04W 28/04* | (2009.01) |

(52) U.S. Cl.
CPC ....... *H04W 72/0413* (2013.01); *H04L 1/1614* (2013.01); *H04L 5/0007* (2013.01); *H04L 5/0053* (2013.01); *H04L 5/0055* (2013.01); *H04L 1/1812* (2013.01); *H04W 28/04* (2013.01)

(58) Field of Classification Search
CPC ... H04W 72/0413; H04W 4/00; H04W 28/04; H04L 1/1614; H04L 5/0007; H04L 5/0053; H04L 5/0055; H04L 1/18; H04J 3/16
USPC ......... 370/203–210, 329–331, 468; 714/749, 714/746, 48, 52, 750
See application file for complete search history.

(56) References Cited

U.S. PATENT DOCUMENTS

| | | | |
|---|---|---|---|
| 7,372,836 B2 | 5/2008 | Hwang et al. | |
| 7,924,755 B2 | 4/2011 | Xu et al. | |
| 8,036,166 B2 * | 10/2011 | Tiirola | H04J 13/00 370/329 |

(Continued)

*Primary Examiner* — Hanh N Nguyen
(74) *Attorney, Agent, or Firm* — The Farrell Law Firm, P.C.

(57) ABSTRACT

Methods are described for a Node B to transmit and for a User Equipment (UE) to receive ACKnowledgement (ACK) information associated with the use of Hybrid Automatic Repeat reQuest (HARQ), also known as HARQ-ACK signaling, in a communication system that includes multiple downlink component carriers or multiple uplink component carriers. An HARQ-ACK signal to a UE is in response to a data packet transmission from the UE and may consist of 2 information bits when the UE has 2 or more transmitter antennas. The HARQ-ACK signal is always located in the same downlink component carrier as the scheduling assignment resulting to the data packet transmission from the UE.

16 Claims, 11 Drawing Sheets

(56) References Cited

U.S. PATENT DOCUMENTS

| | | | |
|---|---|---|---|
| 8,234,534 B2 | 7/2012 | Park et al. | |
| 8,281,204 B2 | 10/2012 | Hu et al. | |
| 8,522,105 B2* | 8/2013 | Papasakellariou | H04L 1/1614 370/329 |
| 8,537,853 B2* | 9/2013 | Falahati | H04L 1/0073 370/465 |
| 8,614,978 B2 | 12/2013 | Che et al. | |
| 9,094,964 B2* | 7/2015 | Papasakellariou | H04L 1/1614 |
| 2010/0135237 A1 | 6/2010 | Papasakellariou et al. | |
| 2013/0223300 A1 | 8/2013 | Yang et al. | |
| 2015/0043433 A1* | 2/2015 | Ren | H04L 1/1854 370/329 |

* cited by examiner

US 9,918,301 B2

TRANSMISSION OF ACKNOWLEDGEMENT SIGNALS

PRIORITY

This application is a Continuation Application of U.S. application Ser. No. 14/011,448 which was filed in the U.S. Patent and Trademark Office (USPTO) on Aug. 27, 2013, which is a Continuation Application of U.S. application Ser. No. 12/684,419 which was filed in the USPTO on Jan. 8, 2010 (now U.S. Pat. No. 8,522,105) and claims priority under 35 U.S.C. § 119(e) to U.S. Provisional Application No. 61/153,069, entitled "Transmission of Acknowledgement Signals", which was filed in the USPTO on Feb. 17, 2009, the contents of each of which are incorporated herein by reference.

BACKGROUND OF THE INVENTION

1. Field of the Invention

The present invention is directed to wireless communication systems and, more specifically, to the transmission of acknowledgement signals in response to the reception of respective data packets.

2. Description of the Related Art

The DownLink (DL) of a communication system transmits signals from a serving base station (Node B) to User Equipments (UEs) over an operating Bandwidth (BW). The DL signals include data signals that provide the data information, control signals that provide control information for the scheduling of data signals, and Reference Signals (RS), also known as pilot signals, that enable coherent demodulation of data or control signals. The DL data signals are transmitted through the Physical Downlink Shared CHannel (PDSCH).

The UpLink (UL) of a communication system transmits signals from UEs to their serving Node B. The UL signals also include data signals, control signals and RS. The UL data signals are transmitted through the Physical Uplink Shared CHannel (PUSCH). In the absence of PUSCH transmission, a UE transmits its UL Control Information (UCI) through the Physical Uplink Control CHannel (PUCCH); otherwise the UE may transmit the UCI through the PUSCH.

A UE, also commonly referred to as a terminal or a mobile station, may be fixed or mobile and may be a wireless device, a cellular phone, a personal computer device, etc. A Node B is generally a fixed station and may also be referred to as a Base Transceiver System (BTS), an access point, or some other terminology.

An exemplary multiplexing method for DL signal transmissions is the Orthogonal Frequency Division Multiple Access (OFDMA), and an exemplary multiplexing method for UL signal transmissions is the Single-Carrier Frequency Division Multiple Access (SC-FDMA), as they are also considered in the 3GPP Long Term Evolution (LTE). These multiplexing methods serve only to illustrate applications and are not restrictive to the present invention.

DL control signals transmitted through the physical layer may be of broadcast or UE-specific (unicast) nature. Broadcast control signals convey system information to all UEs. The system information may be transmitted in different broadcast channels having different transmission rates depending on how quickly the broadcast control information should be obtained by the UEs. For example, a Broadcast CHannel (BCH) may consist of a Primary BCH (P-BCH) and a Secondary BCH (S-BCH). UE-specific control signals convey Scheduling Assignments (SAs), for PDSCH reception (DL SAs) or PUSCH transmission (UL SAs) by UEs, and ACKnowledgement (ACK) and Negative Acknowledgement (NAK) signals associated with the use of Hybrid Automatic Repeat reQuest (HARQ) for PUSCH transmissions (HARQ-ACK signals). The Node B transmits to a UE a HARQ-ACK signal with a positive (ACK) or negative (NAK) information value, in response to a correct or incorrect PUSCH reception, respectively. The Node B transmits the HARQ-ACK signals through the Physical Hybrid-ARQ Indicator CHannel (PHICH). The DL SAs, the UL SAs, the PHICH, and possibly other control channels, are conveyed from the Node B to UEs through the Physical Downlink Control CHannel (PDCCH).

An exemplary PDCCH transmission structure in the DL Transmission Time Interval (TTI), which for simplicity is assumed to consist of one sub-frame having M OFDM symbols, is shown in FIG. 1. The PDCCH 120 occupies the first N OFDM symbols 110. The Node B informs the UEs of the PDCCH size through the transmission of a Physical Control Format Indicator CHannel (PCFICH) in the first OFDM symbol (not shown for simplicity). The remaining M-N OFDM symbols are primarily used for PDSCH transmission 130. The PHICH 140 is transmitted in some PDCCH sub-carriers, also referred to as Resource Elements (REs), which may be placed only in the first PDCCH symbol or in all PDCCH symbols as in FIG. 1. Some OFDM symbols also contain RS REs, 150 and 160, for each of the Node B transmitter antennas which in FIG. 1 are assumed to be two. The PHICH REs are grouped in consecutive REs with only RS REs possibly being placed between PHICH REs. Each group of PHICH REs consists of 4 REs and will be referred to as Resource Element Group (REG). A group of 12 consecutive REs 170 will be referred to as a Physical Resource Block (PRB). For the present example, both the DL BW and the UL BW include PRBs and the respective PDSCH and PUSCH transmissions occur over an integer number of PRBs. For example, an UL BW of 18 MHz consists of $N_{RB}^{UL}$=100 PRBs of 180 KHz with the PRBs indexed from 0 up to $N_{RB}^{UL}-1$.

The PHICH resource used for an HARQ-ACK signal transmission is assumed to be linked to the PRBs used for the respective PUSCH transmission. Therefore, the PHICH resources depend in principle on the total number of PRBs, $N_{RB}^{UL}$, in the UL operating BW. When multiple PRBs are allocated to a PUSCH transmission, the PHICH resource is determined from the PRB with the lowest index $I_{PRB\_RA}^{lowest\_index}$ (first PRB for a PUSCH transmission).

Spatial Division Multiple Access (SDMA) is an effective technique for improving UL spectral efficiency. With SDMA, some PRBs are shared by PUSCH transmissions from multiple UEs. SDMA is facilitated by providing orthogonal RS to the respective UEs so that the Node B can obtain an accurate estimate for the channel response experienced by each PUSCH transmission. Using SC-FDMA for PUSCH transmissions, the RS is assumed to be constructed from a Constant Amplitude Zero Auto-Correlation (CAZAC) sequence. Orthogonal RS can then be obtained by applying different Cyclic Shifts (CS) to the CAZAC sequence representing the RS, or by applying Orthogonal Covers (OC) in the time domain in case of 2 or more RS in the PUSCH. Each UE is informed of the CS, OC, or both, to apply to a CAZAC sequence for the RS transmission in the PUSCH through the CS Indicator (CSI) Information Element (IE) provided in the UL SA (the CSI may also indicate a OC used together with a specific CS).

Since PUSCH PRBs are shared among multiple SDMA UEs, using only $I_{PRB\_RA}^{lowest\_index}$ to determine the PHICH resource for each respective HARQ-ACK signal transmission may lead to collisions as the same PHICH resource may correspond to multiple SDMA UEs if they have the same $I_{PRB\_RA}^{lowest\_index}$ for their PUSCH transmissions. This problem is avoided by having the CSI IE serve not only to assign the CS, or OC, or both, for the RS transmission in the PUSCH but also for adjusting the resource for the respective PHICH transmission.

FIG. 2 illustrates the use of the CSI IE for adjusting the resource of a PHICH transmission where the UL operating BW consists of $N_{RB}^{UL}=100$ PRBs 210, there are 4 SDMA UEs, and the PUSCH transmission BW is 10 PRBs with the lowest PRB index being equal to 8 220. Assuming that the CSI IE consists of 3 bits, the 8 CSI values can map to 8 respective incremental shifts, including a zero shift, for the PHICH resource relative to the one obtained from $I_{PRB\_RA}^{lowest\_index}$. By respectively assigning to the first, second, third, and fourth UEs the first four CSI values, CSI 0 232, CSI 1 234, CSI 2 236, and CSI 3 238, the respective PHICH indexes are PHICH 1=8 242, PHICH 2=9 244, PHICH 3=10 246, and PHICH 4=11 248. This approach requires that the number of SDMA UEs is less than or equal to the number of PRBs assigned to their PUSCH transmissions which is typically the case in practice.

It is desirable that each HARQ-ACK signal is not confined in only one RE but is instead spread over all REs in each REG to obtain interference randomization. To avoid reducing the multiplexing capacity of the PHICH (by a factor of 4 in FIG. 1), orthogonal multiplexing of the PHICH may apply within each REG using, for example, Walsh-Hadamard (WH) orthogonal sequences with Spreading Factor (SF) of $N_{SF}^{PHICH}$ (where, in FIG. 1, $N_{SF}^{PHICH}=4$). For Quadrature Phase Shift Keying (QPSK) modulation and HARQ-ACK signals conveying a binary value (ACK or NAK), each PHICH channel may be placed on the In-phase (I) or Quadrature (Q) QPSK component and be further modulated with an orthogonal sequence over each REG. For example, for a REG consisting of 4 REs and orthogonal sequences with $N_{SF}^{PHICH}=4$, the PHICH multiplexing capacity (PHICH resources) for HARQ-ACK signals with binary values is $2N_{SF}^{PHICH}=8$ (obtained from a factor of 2 from the I/Q dimensions of QPSK times a SF of $N_{SF}^{PHICH}=4$ from the number of orthogonal sequences over the REG of 4 REs).

FIG. 3 illustrates a HARQ-ACK signal transmission from the Node B in one of the PHICH resources available within one REG consisting of 4 REs. An HARQ-ACK bit 310 is multiplied in multipliers 322, 324, 326, and 328, by each element of the WH sequence 332, 334, 336, and 338 and the resulting output is placed on the I-branch of the QPSK modulated RE 342, 344, 346, and 348 (the Q-branch may be used for the HARQ-ACK bit for another UE). The WH sequence may be one of the 4 WH sequences 350. With I/Q multiplexing and orthogonal sequence multiplexing with $N_{SF}^{PHICH}$4,8 PHICH channels are provided within one REG. The UE receiver needs to only perform the conventional functions of QPSK demodulation and orthogonal sequence despreading (and averaging over the repeated PHICH group transmissions as discussed below).

The HARQ-ACK signal transmission in each PHICH group may be repeated over multiple REGs to obtain frequency diversity and improve the effective Signal-to-Interference and Noise Ratio (SINR).

FIG. 4 illustrates the repetition for the HARQ-ACK signal transmission in 3 PHICH groups, 412, 414, and 416, over 3 respective REGs, {422, 424, 426}, {432, 434, 436}, and {442, 444, 446} in the same OFDM symbol (different OFDM symbols may also be used as in FIG. 1). The number of symbols used for the PHICH transmission defines the duration of the PHICH transmission which can be indicated to UEs through the P-BCH. For example, a 1-bit value in the P-BCH can indicate whether the PHICH transmission is in 1 or 3 OFDM symbols.

Multiple PHICH resources mapped to the same set of REs in one or more REGs constitute a PHICH group. PHICH resources in the same PHICH group are separated through I/Q multiplexing and through different orthogonal sequences. A PHICH resource is identified by the index pair ($n_{PHICH}^{group}$, $n_{PHICH}^{seq}$), where $n_{PHICH}^{group}$ is the PHICH group number and $n_{PHICH}^{seq}$ is the orthogonal sequence index within the group. The number of PHICH groups is given by $N_{PHICH}^{group}=\lceil N_g(N_{RB}^{DL}/8)\rceil$ where $N_g \in \{1/6, 1/2, 1, 2\}$ is a parameter identified to UEs through the P-BCH and the $\lceil \ \rceil$ operation rounds a number to its next integer. It is assumed that the total number of DL PRBs, $N_{RB}^{DL}$, is known by the UEs prior to any PHICH reception while the total number of UL PRBs, $N_{RB}^{UL}$, may not be known. For this reason, $N_{RB}^{DL}$ (not $N_{RB}^{UL}$) is used to specify $N_{PHICH}^{group}$. The PHICH group number is determined by Equation (1).

$$n_{PHICH}^{group}=(I_{PRB\_RA}^{lowest\_index}+CSI) \mod N_{PHICH}^{group} \qquad (1)$$

The orthogonal sequence index within the group is determined by Equation (2)

$$n_{PHICH}^{seq}=(\lfloor I_{PRB\_RA}^{lowest\_index}/N_{PHICH}^{group}\rfloor+CSI) \mod 2N_{SF}^{PHICH} \qquad (2)$$

In Equation (2), the $\lfloor \ \rfloor$ operation rounds a number to its previous integer. PHICH resources corresponding to consecutive PRBs are mapped to different PHICH groups.

In order to support higher data rates than possible in legacy communication systems, for aggregation of multiple Component Carriers (CCs) is typically considered in both the DL and UL of the communication system to provide higher operating BWs. For example, to support communication over 100 MHz, aggregation of five 20 MHz CCs can be used. For ease of reference, UEs capable of operating only over a single CC will be referred to as "legacy-UEs" while UEs capable of operating over multiple CCs will be referred to as "advanced-UEs". From a set of multiple DL CCs or UL CCs, an advanced-UE may be assigned PDSCH reception or PUSCH transmission, respectively, only in a sub-set of DL CCs or UL CCs.

FIG. 5 further illustrates the principle of CC aggregation in the exemplary case of DL CCs. This principle can be extended in the same manner for UL CCs. An operating BW of 100 MHz 510 is constructed by the aggregation of 5 (contiguous, for simplicity) DL CCs, 521, 522, 523, 524, 525, each having a BW of 20 MHz. As for the sub-frame structure for a single DL CC in FIG. 1, the sub-frame structure in the case of multiple DL CCs consists of a PDCCH region, such as for example 531 through 535, and a PDSCH region, such as for example 541 and 545. The PDCCH region size may vary per DL CC and its value is signaled by the respective PCFICH. For CCs 1 and 5, the PDCCH size is respectively, PDCCH-1=3 symbols 531 and PDCCH-5=1 symbol 535. Since the PDSCH size is found by subtracting the respective PDCCH size from the sub-frame size, PDSCH-1=11 symbols 541 and PDSCH-5=13 symbols 545.

FIG. 5 also illustrates the extension of the PDCCH design for SA transmissions to advanced-UEs. Scheduling is assumed to be independent among CCs and each PDCCH is contained within one CC regardless of the number of CCs an advanced-UE may use for PDSCH reception or PUSCH transmission. The advanced-UE 550 receives two distinct SAs, SA2 552 and SA3 553, for respective PDSCH reception in the second and third CCs, while the advanced-UE 560 receives SA5 565 for PDSCH reception in the fifth CC. Different Transport Blocks (TBs) are associated with different SAs. Each SA scheduling PDDCH reception in a DL CC or PUSCH transmission in an UL CC that is either linked to the DL CC with the SA transmission or indicated by the SA, may be transmitted in the same DL CC or in a different DL CC.

The examples used herein consider a communication system using CC aggregation and investigates aspects regarding the mapping of PHICH resources. Having a variable number of DL CCs and UL CCs configured for an advanced-UE necessitates a different mapping for the PHICH resources for advanced-UEs relative to the one for legacy-UEs. Moreover, as the DL operating BW may be substantially greater than the UL operating BW, it is desirable that the dimensioning of PHICH groups is not based on the total number of DL PRBs. Also, unlike legacy-UEs for which PUSCH transmission is assumed to be limited to one CodeWord (CW) or one TB, resulting in one respective HARQ-ACK information bit in the DL, transmission of two CWs or two TBs, each using a separate HARQ process, may apply for advanced-UEs having two transmitter antennas through the application of Spatial Multiplexing (SM). Then, support for two HARQ-ACK information bits is required.

Therefore, there is a need to map PHICH resources for advanced-UEs having multiple configured DL CCs and UL CCs.

There is also a need to avoid over-dimensioning the number of PHICH groups in order to avoid unnecessarily increasing the respective DL overhead.

There is also another need to efficiently support 2-bit HARQ-ACK signal transmission while avoiding PHICH collisions.

SUMMARY OF THE INVENTION

Accordingly, the present invention has been designed to solve at least the aforementioned limitations and problems in the prior art and the present invention provides methods for the transmission by a Node B and for the reception by a UE of HARQ-ACK signals through a PHICH in response to PUSCH transmissions by the UE in a communication system consisting of multiple DL CCs or multiple UL CCs.

In accordance with an aspect of the present invention, a method for wireless communication includes receiving two transport blocks from a user equipment, determining two resources identified by a group index and a sequence index based on an index $I_{PRB\_RA}^{lowest\_index}$, a value $I_{PRB\_RA}^{lowest\_index}+1$, and a value associated with a cyclic shift of a reference signal, the index $I_{PRB\_RA}^{lowest\_index}$ being an index of a resource for transmission of an uplink data packet, and transmitting two acknowledgement bits associated with the received two transport blocks using the determined two resources.

In accordance with another aspect of the present invention, an apparatus for wireless communication includes a receiver configured to receive a signal, a transmitter configured to transmit a signal, and a controller configured to control operations of receiving two transport blocks from a user equipment, determining two resources identified by a group index and a sequence index based on an index $I_{PRB\_RA}^{lowest\_index}$, a value $I_{PRB\_RA}^{lowest\_index}+1$, and a value associated with a cyclic shift of a reference signal, the index $I_{PRB\_RA}^{lowest\_index}$ being an index of a resource for transmission of an uplink data packet, and transmitting two acknowledgement bits associated with the received two transport blocks using the determined two resources.

In accordance with another aspect of the present invention, a method for wireless communication includes transmitting two transport blocks to a Node B, determining two resources identified by a group index and a sequence index based on an index $I_{PRB\_RA}^{lowest\_index}$, a value $I_{PRB\_RA}^{lowest\_index}+1$, and a value associated with a cyclic shift of a reference signal, the index $I_{PRB\_RA}^{lowest\_index}$ being an index of a resource for transmission of an uplink data packet, and receiving two acknowledgement bits associated with the transmitted two transport blocks using the determined two resources.

In accordance with another aspect of the present invention, an apparatus for wireless communication includes a transmitter configured to transmit a signal, a receiver configured to receive a signal, and a controller configured to control operations of transmitting two transport blocks to a Node B, determining two resources identified by a group index and a sequence index based on an index $I_{PRB\_RA}^{lowest\_index}$, a value $I_{PRB\_RA}^{lowest\_index}+1$, and a value associated with a cyclic shift of a reference signal, the index $I_{PRB\_RA}^{lowest\_index}$ being an index of a resource for transmission of an uplink data packet, and receiving two acknowledgement bits associated with the transmitted two transport blocks using the determined two resources.

BRIEF DESCRIPTION OF THE DRAWINGS

The above and other aspects, features, and advantages of the present invention will be more apparent from the following detailed description taken in conjunction with the accompanying drawings, in which:

FIG. 10 is a diagram illustrating the mapping of PHICH resources when more than one DL CCs are associated with a more than one UL CCs;

DETAILED DESCRIPTION OF THE EMBODIMENTS OF THE INVENTION

The present invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described in relation to an Orthogonal Frequency Division Multiple Access (OFDMA) communication system, it also applies to all Frequency Division Multiplexing (FDM) systems in general and to Single-Carrier Frequency Division Multiple Access (SC-FDMA), OFDM, FDMA, Discrete Fourier Transform (DFT)-spread OFDM, DFT-spread OFDMA, SC-OFDMA, and SC-OFDM systems in particular.

The invention considers that an advanced-UE is semi-statically assigned the CCs over which it may perform PDSCH reception (DL CCs) or PUSCH transmission (UL CCs). The transmission of DL SAs or UL SAs to an advanced-UE is only over one or more DL CCs of PDSCH reception. A different TB is associated with each DL SA or UL SA. A DL SA may address PRBs for the associated PDSCH reception in only one DL CC or in multiple DL CCs. Similarly, an UL SA may address PRBs for the associated PUSCH transmission in only one UL CC or in multiple UL CCs. In order to associate one or more UL CCs with the UL SA transmitted in one or more DL CCs, respectively, a one-to-one mapping can be preconfigured between the DL CCs of the UL SA transmission and the UL CCs of PUSCH transmission or explicit indexing can be included in the UL SA to indicate the UL CCs for PUSCH transmission.

Figure 1:
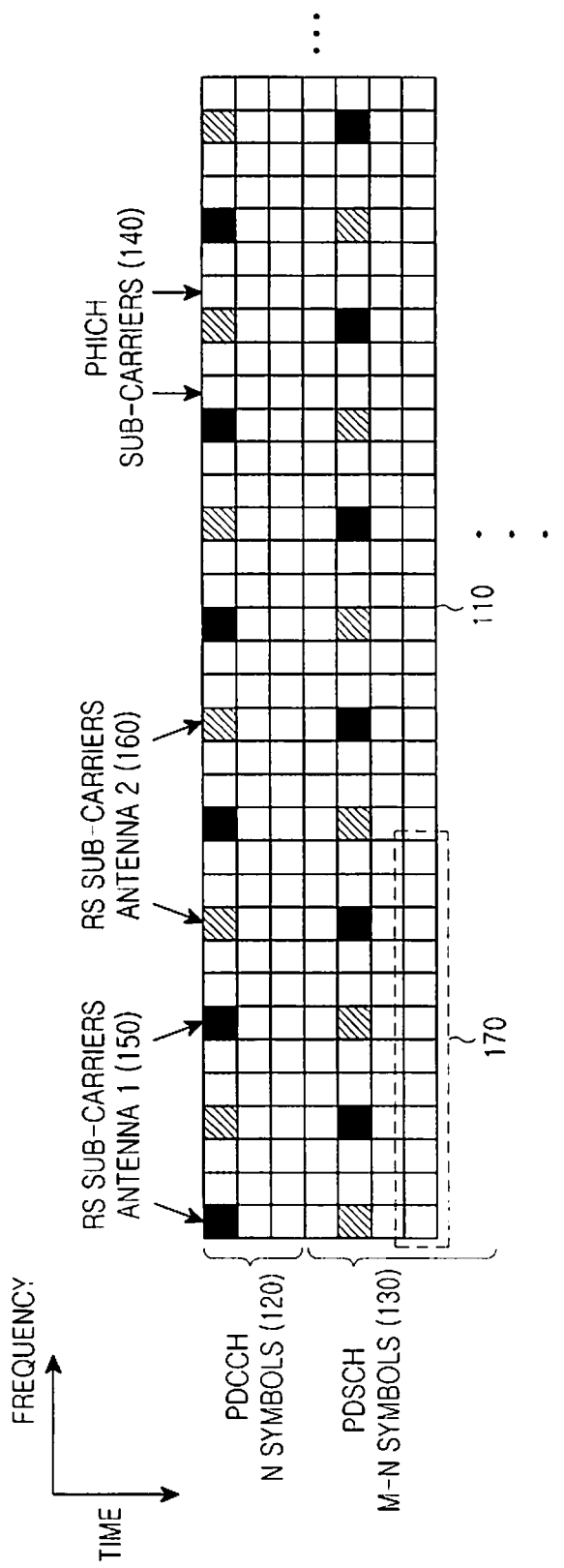
FIG. 1 is a diagram illustrating an exemplary DL sub-frame structure for PDCCH, PDSCH, and PHICH transmissions in the DL of the communication system.
Figure 2:
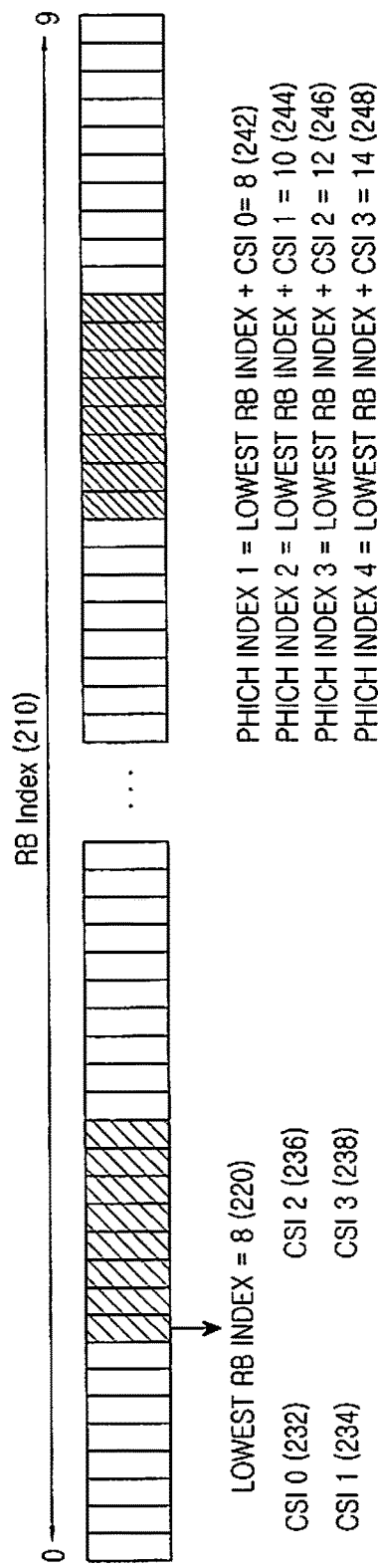
FIG. 2 is a diagram illustrating the use of the CSI IE for adjusting the resource of a PHICH transmission.
Figure 3:
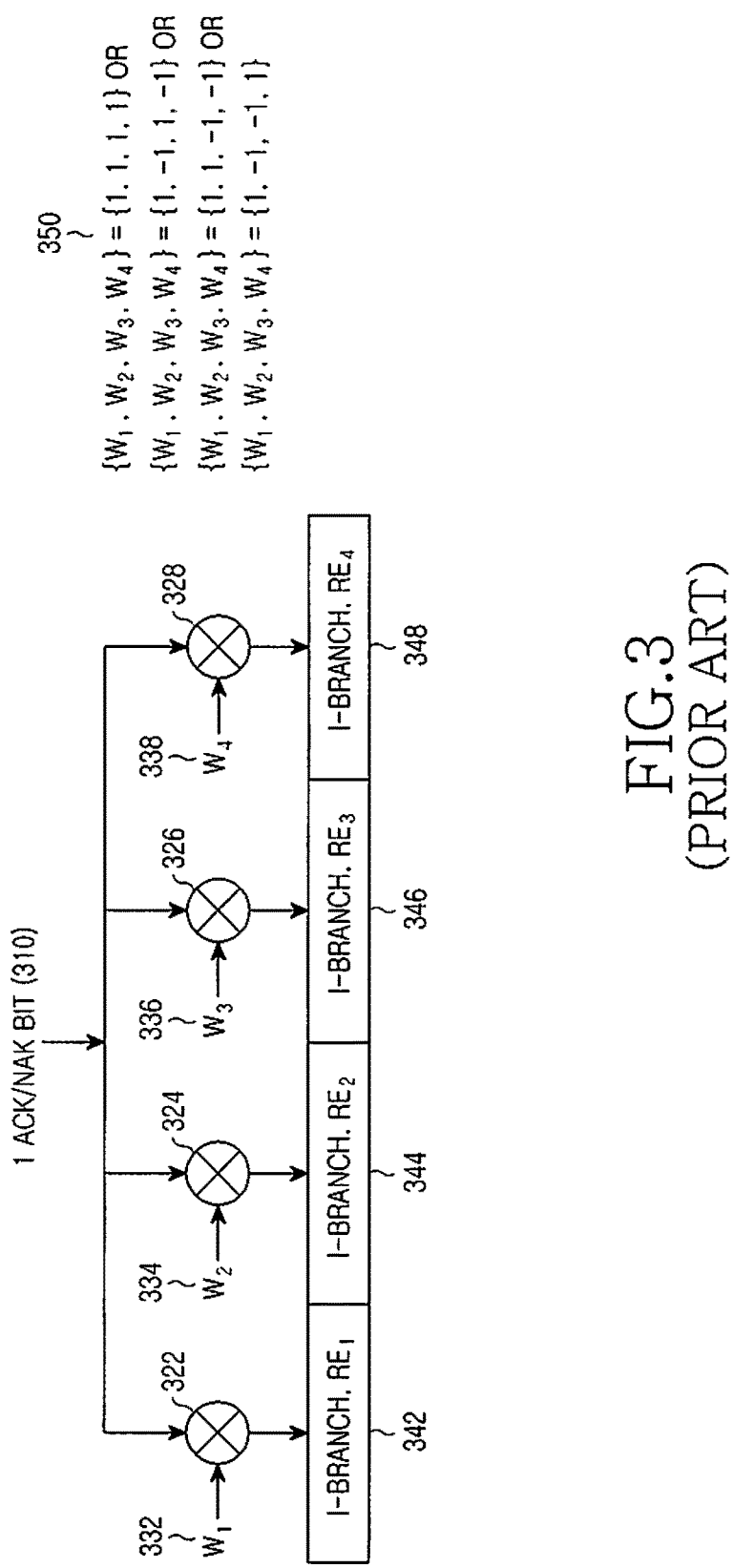
FIG. 3 is a block diagram illustrating the HARQ-ACK signal transmission from the Node B in one of the PHICH resources available within one REG consisting of 4 REs.
Figure 4:
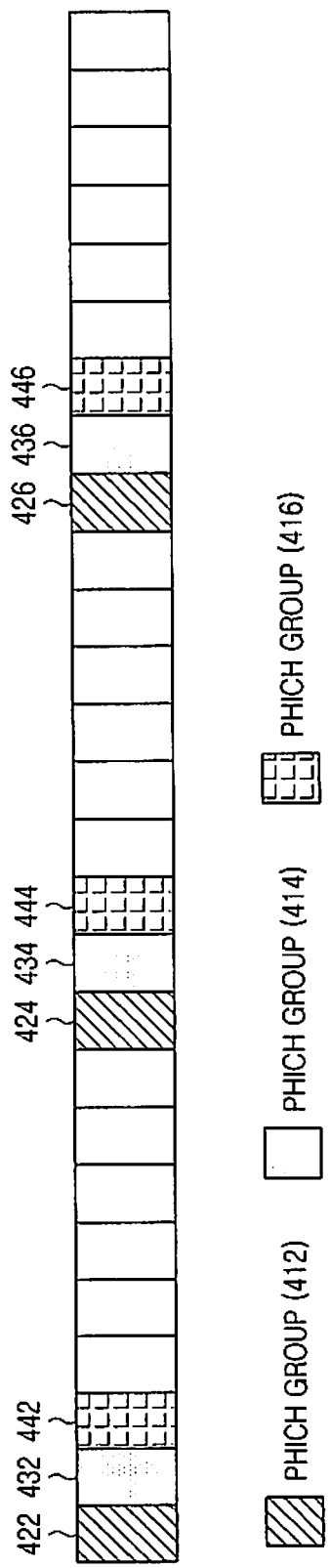
FIG. 4 is a diagram illustrating the repetition for the HARQ-ACK signal transmission in 3 PHICH groups.
Figure 5:
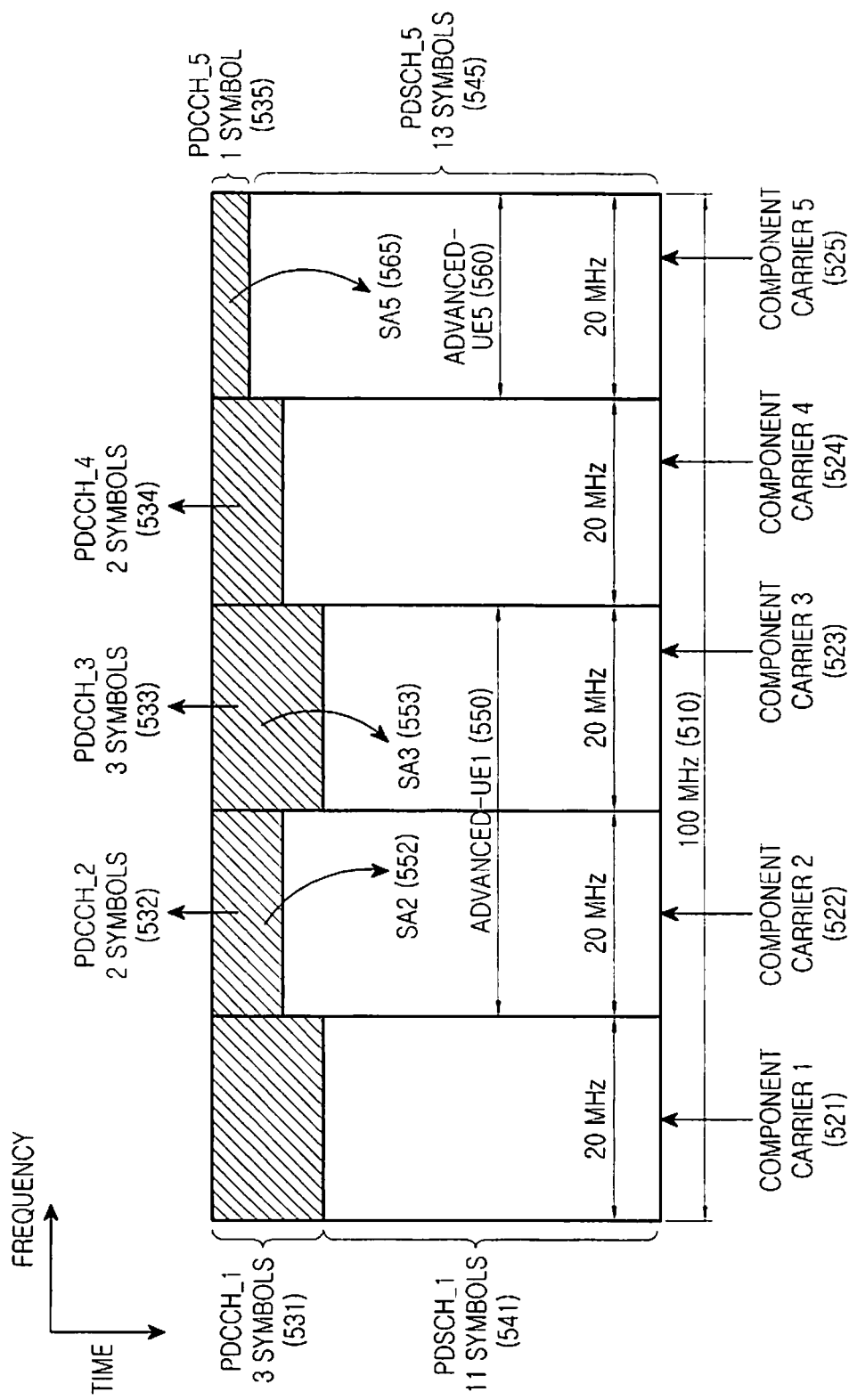
FIG. 5 is a diagram illustrating the principle of component carrier aggregation.

An advanced-UE is assumed to be assigned, among its DL CCs, a primary DL CC. The primary DL CC serves as a reference relative to the remaining, secondary, DL CCs. For example, referring to FIG. 5, DL CC2 may be the primary DL CC for advanced-UE1 while DL CC3 is a secondary DL CC. The secondary DL CCs may also be ordered, in which case the DL CCs can be referred to as primary, first secondary, second secondary, and so on. Equivalently, the DL CCs may be ordered as first DL CC, second DL CC, and so on, and a DL SA or an UL SA is always transmitted in the first DL CC. For simplicity, the "primary" and "secondary" terminology will be used but the "first", "second" and so on terminology may also apply.

Figure 6:
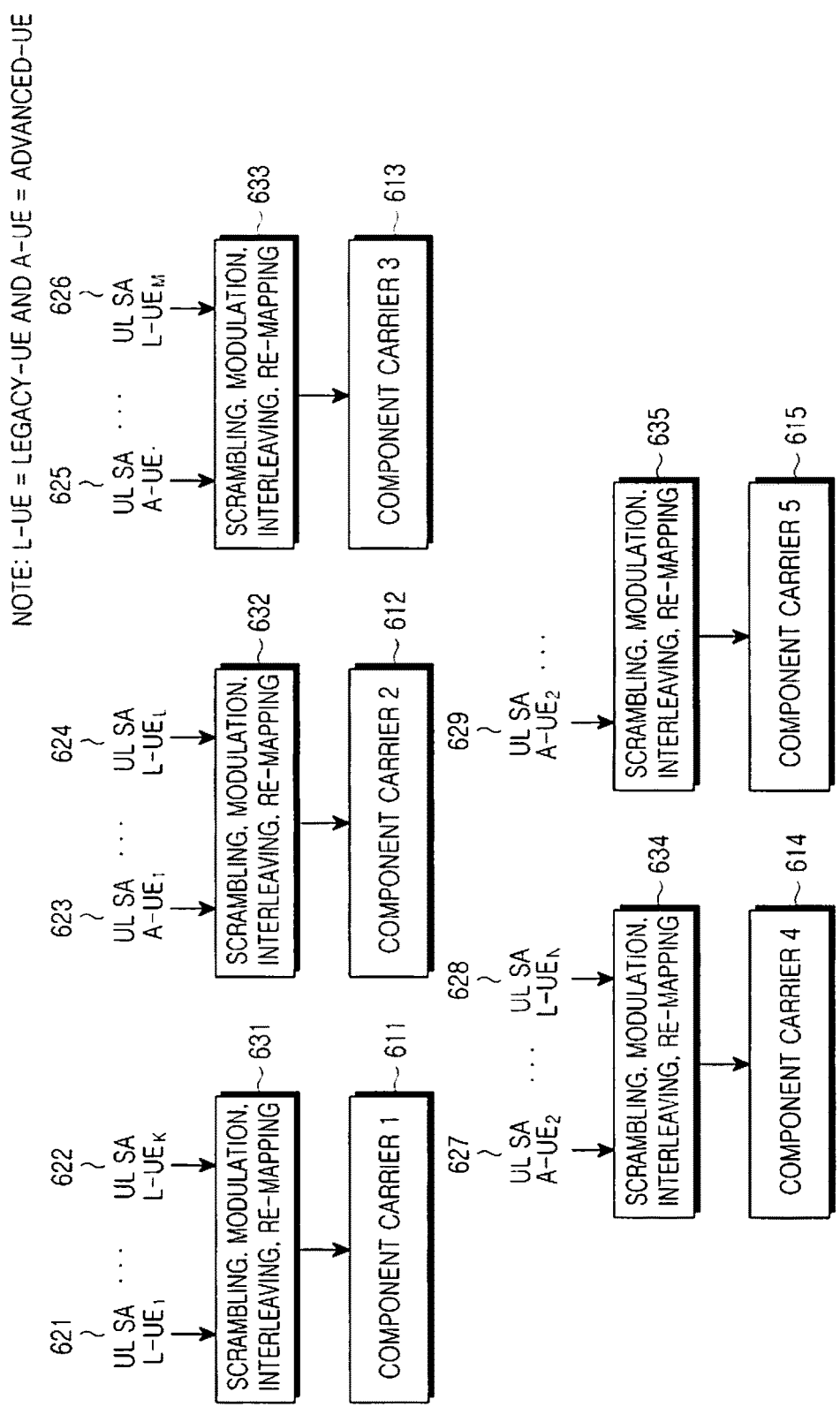
FIG. 6 is a diagram illustrating the transmission of UL SAs in 5 DL CCs.

FIG. 6 further illustrates the transmission of UL SAs in 5 CCs. The transmission of DL SAs can be performed in the same manner (not shown). The first DL CC 611 supports UL SA transmissions only to legacy-UEs, such as L-UE$_1$ 621 and L-UE$_K$ 622. The second 612 and third 613 DL CCs support UL SA transmissions to a mixture of advanced-UEs, such as A-UE$_1$ having UL SAs 623 and 625, and legacy-UEs, such as L-UE$_L$ and L-UE$_M$ having respective UL SAs 624 and 626. A-UE$_1$ has 2 DL CCs. The primary DL CC is DL CC2 and the secondary DL CC is DL CC3. DL CC4 614 also supports a mixture of advanced-UEs and legacy-UEs while DL CC5 615 supports only advanced-UEs. A-UE$_2$ also has 2 DL CCs. The primary DL CC is DL CC4 and the secondary DL CC is DL CC5. UL SA transmission to A-UE$_2$ is in the primary DL CC 627 and in the secondary DL CC 629. After the UL SAs are encoded, scrambling, modulation, interleaving, and RE-mapping follow in each DL CC, 631, 632, 633, 634, and 635.

Figure 7:
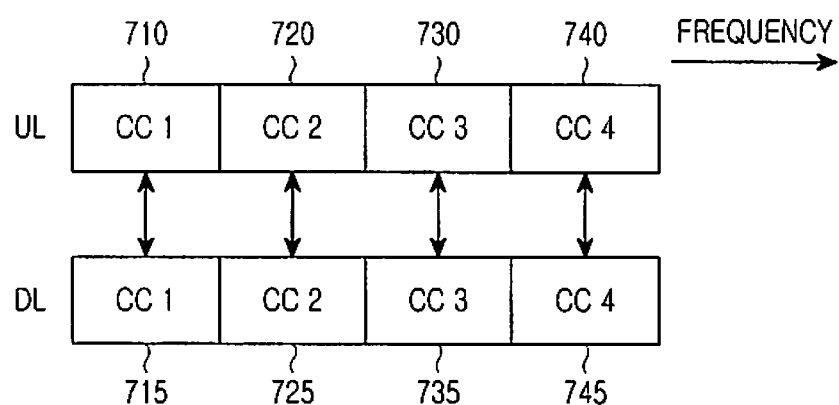
FIG. 7 is a diagram illustrating the mapping of PHICH resources to multiple DL CCs when a one-to-one mapping applies between an UL CC and a DL CC.

For the mapping of the PHICH resources to DL CCs, three cases are identified. The first case is the extension of a single DL CC and a single UL CC to an equal number of multiple DL CCs and multiple UL CCs with a one-to-one mapping (link) between an UL CC and a DL CC as illustrated in FIG. 7. UL CC1 710, UL CC2 720, UL CC3 730, and UL CC4 740 are respectively associated with DL CC1 715, DL CC2 725, DL CC3 735, and DL CC4 745. The PHICH resources in each DL CC are determined based on the same mapping to the UL PRB, in the respective UL CC, and CSI as the one described in Equation (1) and Equation (2) for legacy-UEs. Therefore, when an UL CC is uniquely mapped to a DL CC, the invention assumes that the PHICH transmission is only in that DL CC and the same mapping applies for the PHICH resources as in the case of single DL CC and single UL CC. This determination of the PHICH resources applies regardless of whether the UL SA is transmitted over one or multiple DL CCs or whether the PUSCH is transmitted over one or multiple UL CCs. Alternatively, the PHICH transmission is in the DL CC providing the UL SA for the respective PUSCH transmission by the advanced-UE. Therefore, if the UL SA scheduling PUSCH transmission in UL CC1 was obtained in DL CC2, the respective PHICH transmission is in DL CC2.

Figure 8:
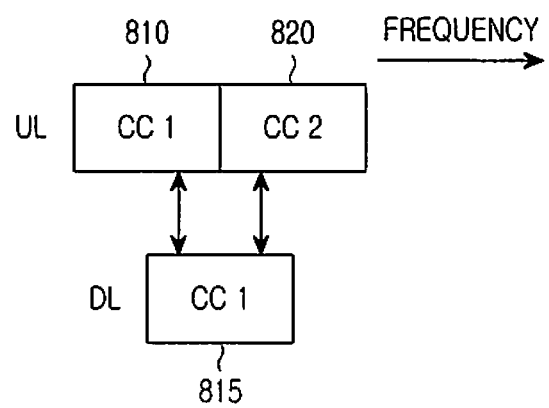
FIG. 8 is a diagram illustrating the mapping of PHICH resources when more than one UL CCs are associated with a single DL CC.

The second case considers that more than one UL CCs are associated with a single DL CC as illustrated in FIG. 8 where UL CC1 810 and UL CC2 820 are linked with DL CC 815. For advanced-UEs, the number of PRBs in all these UL CCs should be jointly considered when determining the PHICH resources in the DL. If the number of PRBs in the UL CC1 is $N_{RB}^{UL1}$ and the number of PRBs in UL CC2 is $N_{RB}^{UL2}$ then, for the purposes of PHICH mapping, the PRBs in UL CC2 can be numbered from $N_{RB}^{UL1}$ up to $N_{RB}^{UL1}+N_{RB}^{UL2}-1$. This can be indicated to advanced-UEs through broadcast signaling or through UE-specific higher layer signaling such as Radio Resource Control (RRC) signaling. For legacy-UEs, the PHICH resource mapping can be as previously described. If legacy-UEs are supported in both UL CCs, using the same PHICH resource mapping as in the case of a single UL CC linked to a single DL CC may result in collisions of PHICH resources as the same PRB numbering is used in each UL CC and the same broadcast channel is received from the single DL CC. To avoid this problem, the Node B scheduler can assign to legacy-UEs the two parameters determining the PHICH resource, namely the first PRB of the PUSCH transmission and the CSI, so that legacy-UEs having PUSCH transmissions in different UL CCs do not have the same PHICH resource for the subsequent DL transmission in the common DL CC.

Figure 9:
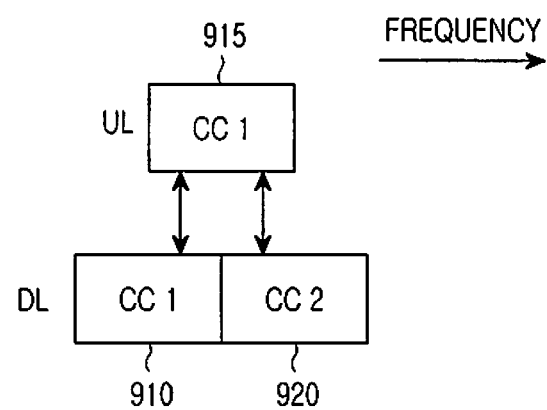
FIG. 9 is a diagram illustrating the mapping of PHICH resources when more than one DL CCs are associated with a single UL CC.

The third case considers that more than one DL CCs are associated with a single UL CC as illustrated in FIG. 9 where DL CC1 910 and DL CC2 920 are linked to UL CC 915. If legacy-UEs are linked to either DL CC1 or DL CC2, the ones linked to DL CC1 have the respective PHICH transmissions in DL CC1 and the ones linked to DL CC2 have the respective PHICH transmissions in DL CC2. The required PHICH resources will be approximately doubled but no modifications to the conventional PHICH resource mapping method are needed. For advanced-UEs, the DL CC carrying the PHICH transmission is the primary DL CC.

If legacy-UEs are linked only to DL CC1, and DL CC2 is used exclusively by advanced-UEs, then, in order to minimize the PHICH overhead, the PHICH transmission can be only in DL CC1 (no PHICH is transmitted in DL CC2), and the respective PHICH resource mapping can be as previously described. The advanced-UEs can be notified that PHICH transmission is only in DL CC1 either through additional bits in a broadcast channel transmitted in DL CC1 and/or DL CC2 or through RRC signaling. If only advanced-UEs exist in the communication system, the PHICH transmission can be configured in the same manner (as in the case where legacy UEs are linked only to DL CC1). In this case, DL CC2 has no PHICH transmissions.

The baseline setups in FIG. 8 and FIG. 9 can be generalized to include more DL CCs and/or more UL CCs. Such a generalization is illustrated in FIG. 10 wherein the communication system includes 3 DL CCs, 1010, 1020, and 1030 and 2 UL CCs, 1015 and 1025. Legacy-UEs are assumed to have one DL CC linked to one UL CC. If legacy-UEs have PUSCH transmissions in both UL CC1 and UL CC2, the respective PHICH transmissions are in DL CC1 and DL CC2 and the conventional PHICH resource mapping applies. For advanced-UEs, DL CC3 may not contain any PHICH transmission and this is indicated either through broadcast or through dedicated signaling as previously described. If legacy-UEs have PUSCH transmissions only in UL CC1 or if legacy-UEs do not exist, the PHICH transmission to advanced-UEs can be only in DL CC1, if the PRBs for the UL CCs are jointly considered for the purposes of PHICH resource mapping as described in FIG. 8. Otherwise, the PHICH transmission can be in both DL CC1 and DL CC2 as described in FIG. 9.

A 2-bit HARQ-ACK signal transmission on the PHICH in response to a PUSCH transmission consisting of two CWs (or two TBs) from an advanced-UE using Spatial Multiplexing (SM) from at least 2 UE transmitter antennas, with each CW (or TB) having a separate HARQ process, can be supported by modifying the conventional PHICH mapping method and imposing some minor restrictions on the number of PRBs for the PUSCH transmission. Assuming that SDMA is not applied and that at least 2 PRBs are used by the PUSCH transmission, the PHICH resources for the first and second HARQ-ACK bits of the respective first and second CWs or TBs can be respectively derived from the first and second PRBs of the PUSCH transmission. Therefore, for the PHICH transmission of the first HARQ-ACK bit, the PHICH group number and the orthogonal sequence index are determined as in Equation (1) and Equation (2). For the PHICH transmission of the second HARQ-ACK bit, the PHICH group number $n_{PHICH}^{group}$ and the orthogonal sequence index $n_{PHICH}^{seq}$ are respectively determined by Equation (3).

$$n_{PHICH}^{group}=(I_{PRB\_RA}^{lowest\_index}+1+CSI) \bmod N_{PHICH}^{group}$$

and $$n_{PHICH}^{seq}=(\lfloor (I_{PRB\_RA}^{lowest\_index}+1)/N_{PHICH}^{group} \rfloor + CSI) \bmod 2N_{SF}^{PHICH} \quad (3).$$

Alternatively, the resources for the 2-bit HARQ-ACK signal transmission can be determined assuming that the RS transmission from the first of the at least 2 UE transmitter antennas uses a first CSI, $CSI_1$, and the RS transmission from the second of the at least 2 UE transmitter antennas uses a second CSI, $CSI_2$. Only the first CSI, $CSI_1$, may be provided by the CSI IE of the UL SA and the second CSI, $CSI_2$, may be implicitly determined based on the value of the first CSI. Then, the PHICH group number and the orthogonal sequence index for the transmission of the first HARQ-ACK bit and of the second HARQ-ACK bit are respectively determined using Equation (1) and Equation (2) where the first CSI value, $CSI_1$, and the second CSI value, $CSI_2$, respectively apply.

The above PHICH resources for the first and second HARQ-ACK bits may be located in different REGs and therefore, the receiver of an advanced-UE supporting transmission of 2 CWs (or 2 TBs) may be required to monitor 2 REGs for the respective PHICH detection. To avoid increasing the complexity of the advanced-UE receiver with respect to the PHICH detection, if the PUSCH transmission can be mandated to use at least $N_{PHICH}^{group}+1$ PRBs, the PHICH resources for the 2-bit HARQ-ACK signal transmission can always be located in the same REG. If the first and second PRBs map to the same PHICH group, the above PHICH mapping applies. However, if the first and second PRBs map to different PHICH groups, as is typically the case, the above PHICH mapping rule is modified so that the PHICH resources for the first and second HARQ-ACK bits are respectively determined from the first and $N_{PHICH}^{group}+1$ assigned PRBs, instead of the first and second PRBs, without increasing the total required PHICH resources. Therefore, in the latter case, the PHICH group number $n_{PHICH}^{group}$ and the orthogonal sequence index $n_{PHICH}^{seq}$ for the transmission of the second HARQ-ACK bit is determined by Equation (4) and Equation (5).

$$n_{PHICH}^{group}=(I_{PRB\_RA}^{lowest\_index}+N_{PHICH}^{group}+CSI) \bmod N_{PHICH}^{group} \quad (4)$$

$$n_{PHICH}^{seq}=(\lfloor (I_{PRB\_RA}^{lowest\_index}+N_{PHICH}^{group} \rfloor +CSI) \bmod 2N_{SF}^{PHICH} \quad (EQ. 5)$$

With the above mapping, the Node B scheduler may also schedule the PUSCH transmission so that the 2-bit HARQ-ACK signal transmission is in the same QPSK symbol, thereby eliminating detection problems that may be caused by having different transmission power between the I-branch and the Q-branch.

If SDMA is applied to PUSCH transmissions among $N_{SDMA}$ advanced-UEs and the CSI consists of $N_{CSI}$ bits then, to accommodate PHICH mapping for the transmission of 2 CWs (or 2 TBs) in the PUSCH, it is required that the PUSCH transmission is greater than at least $2 \cdot N_{SDMA}$ PRBs in order to avoid collisions of PHICH resources. It is also required that $N_{SDMA} \leq 2^{N_{CSI}}$ in order to uniquely differentiate the PHICH resources for each SDMA UE. The PHICH resources for the 2-bit HARQ-ACK signal transmission to the advanced-UE having assigned CSI=0 can be derived from the first and second PRBs of the PUSCH transmission, the PHICH resources for the 2-bit HARQ-ACK transmission to the advanced-UE having assigned CSI=1 can be derived from the third and fourth PRBs of the PUSCH transmission, and so on.

When applying SDMA among UEs having PUSCH transmission with 2 CWs (or 2 TBs) and UEs having PUSCH transmission with 1 CW (or) 1 TB), the former UEs need to assume that all UEs have PUSCH transmission of 2 CWs (or 2 TBs). Then, by assigning the smaller CSI values to UEs having PUSCH transmission with 1 CW (or 1 TB), collisions of PHICH resources can be avoided at the expense of some small PHICH resource overhead. Therefore, an advanced-UE having transmission of 2 CWs (or 2 TBs) determines the PHICH group number for the transmission of the first ACK/NAK bit by Equation (6a)

$$n_{PHICH}^{group}=(I_{PRB\_RA}^{lowest\_index}+2 \cdot CSI) \bmod N_{PHICH}^{group} \quad (6a)$$

The orthogonal sequence index within the group is determined by Equation (7a).

$$n_{PHICH}^{seq} = (\lfloor I_{PRB\_RA}^{lowest\_index}/N_{PHICH}^{group} \rfloor 2 \cdot CSI) \mod 2N_{SF}^{PHICH} \quad (7a)$$

The PHICH group number for the transmission of the second HARQ-ACK bit is determined by Equation (6b).

$$n_{PHICH}^{group} = (I_{PRB\_RA}^{lowest\_index} + 2 \cdot CSI + 1) \mod N_{PHICH}^{group} \quad (6b)$$

The orthogonal sequence index within the group is determined by Equation (7b).

$$n_{PHICH}^{seq} = (\lfloor I_{PRB\_RA}^{lowest\_index}/N_{PHICH}^{group} \rfloor + 2 \cdot CSI + 1) \mod 2N_{SF}^{PHICH} \quad (7b)$$

Figure 11:
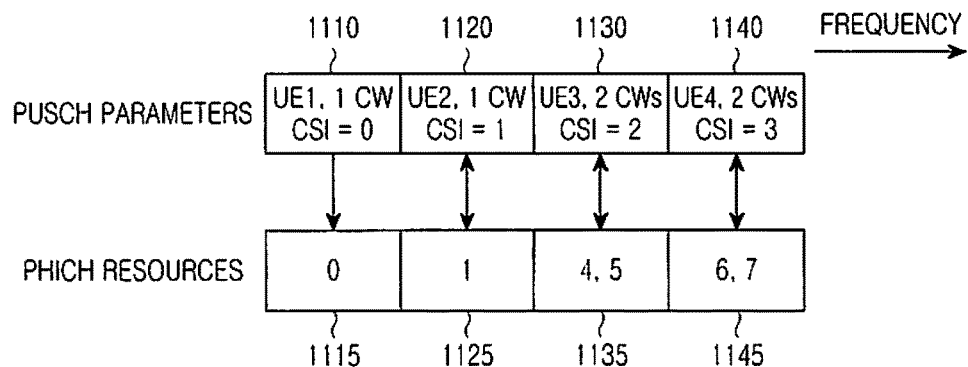
FIG. 11 is a diagram illustrating a first PHICH resource mapping for PUSCH transmission including 2 CWs (or 2 TBs)

A first PHICH resource mapping for PUSCH transmission consisting of 2 CWs (or of 2 TBs) is illustrated in FIG. 11 assuming $N_{PHICH}^{group}=1$, $N_{SF}^{PHICH}=4$, and $I_{PRB\_RA}^{lowest\_index}=0$. UE1 1110 transmits 1 CW (or 1 TB) and is assigned CSI=0. The respective PHICH resource 1115 for the 1-bit HARQ-ACK signal transmission is resource 0. UE1 1120 transmits 1 CW (or 1 TB) and is assigned CSI=1. The respective PHICH resource 1125 for the 1-bit HARQ-ACK signal transmission is resource 1. UE3 1130 transmits 2 CWs (or 2 TBs) and is assigned CSI=2. The respective PHICH resources 1135 for the 2-bit HARQ-ACK signal transmission are resources 4 and 5. UE4 1140 transmits 2 CWs (or 2 TBs) and is assigned CSI=3. The respective PHICH resources 1145 for the 2-bit HARQ-ACK signal transmission are resources 6 and 7. It can be observed that UE3 and UE4, assigned respectively CSI=2 and CSI=3, assume that UE1 and UE2, assigned respectively CSI=0 and CSI=1, also transmit 2 CWs (or 2 TBs). This leads to the PHICH resources 2 and 3 being unused but avoids any collision of PHICH resources. Note that under the restriction of having the PUSCH transmission over at least $2 \cdot (N_{PHICH}^{group} + N_{SDMA})$ PRBs, both HARQ-ACK bits may be transmitted in the same PHICH group as for the non-SDMA case by simply modifying the PHICH resources for the transmission of the second HARQ-ACK bit as previously described.

Figure 12:
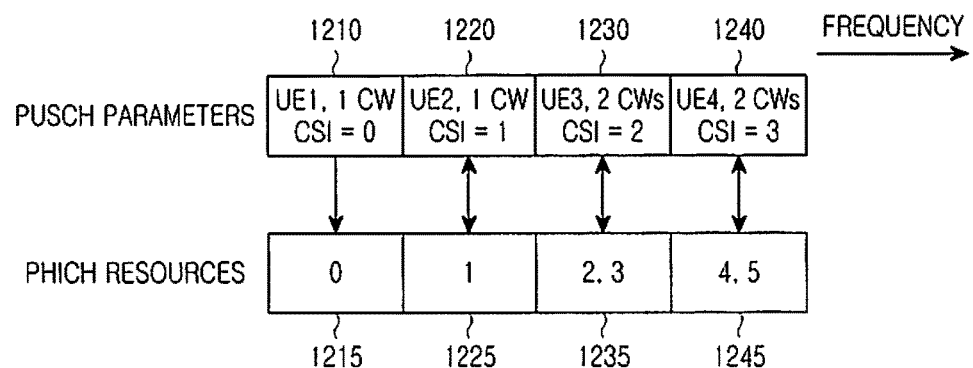
FIG. 12 is a diagram illustrating a second PHICH resource mapping for PUSCH transmission including 2 CWs (or 2 TBs)

A second PHICH resource mapping for PUSCH transmission consisting of 2 CWs (or 2 TBs) is illustrated in FIG. 12 assuming $N_{PHICH}^{group}=1$, $N_{SF}^{PHICH}=4$, and $I_{PRB\_RA}^{lowest\_index}=0$. UE1 1210 transmits 1 CW (or 1 TB) and is assigned CSI=0. The respective PHICH resource 1215 for the 1-bit HARQ-ACK signal transmission is resource 0. UE2 1220 transmits 1 CW (or 1 TB) and is assigned CSI=1. The respective PHICH resource 1225 for the 1-bit HARQ-ACK signal transmission is resource 1. UE3 1230 transmits 2 CWs (or 2 TBs) and is assigned CSI=2 and CSI=3 for the RS transmission from a first UE antenna and from a second UE antenna, respectively (the UE is assumed to have at least 2 transmitter antennas in conjunction with the application of SM). The respective PHICH resources 1235 for the 2-bit HARQ-ACK signal transmission are resources 2 and 3 respectively determined from CSI=2 and CSI=3. UE4 1240 transmits 2 CWs (or 2 TBs) and is assigned CSI=4 and CSI=5. The respective PHICH resources 1245 for the 2-bit HARQ-ACK signal transmission are resources 4 and 5. It can be observed that unlike the first PHICH resource mapping, UE3 and UE4 need not be aware of the presence of other UEs and PHICH resource waste need not occur.

An alternative to the explicit 2-bit HARQ-ACK signal transmission is to bundle the 2 bits into 1 bit with ACK being transmitted if both CWs (or both TBs) are received correctly and NAK being transmitted otherwise. The tradeoff to the decreased PHICH overhead is the reduced efficiency of the HARQ operation as a correctly received CW (or TB) needs to be retransmitted if the other CW (or TB) is not correctly received.

For legacy communication systems, the number of PHICH groups $N_{PHICH}^{group}$ is assumed to be given by $N_{PHICH}^{group} = \lceil N_g(N_{RB}^{DL}/8) \rceil$ as was previously described. The reason for associating $N_{PHICH}^{group}$ with $N_{RB}^{DL}$, instead of the total number of UL PRBs $N_{RB}^{UL}$, is to reduce the amount of information that needs to be most often broadcasted (P-BCH). Legacy-UEs are assumed to know only $N_{RB}^{DL}$ before having to receive the PHICH and $N_{RB}^{UL}$ is subsequently obtained. Although using $N_{RB}^{DL}$, instead of $N_{RB}^{UL}$, to set the number of PHICH groups may be reasonable for legacy communication systems because $N_{RB}^{DL}$ and $N_{RB}^{UL}$ have similar values due to mostly symmetric traffic, such as for Voice over Internet Protocol (VoIP) services, the PHICH overhead becomes substantial when $N_{RB}^{DL}$ is several times greater than $N_{RB}^{UL}$, as may often be the case for advanced communication systems supporting data services having asymmetric traffic distributions. The discrepancy in the $N_{RB}^{DL}$ and $N_{RB}^{UL}$ values is further exacerbated by the fact that several UL PRBs are used for PUCCH transmission and, therefore, will not be actually used for PHICH mapping. For example, for $N_{RB}^{DL}=4N_{RB}^{UL}$ a PHICH resource is assigned for every UL PRB, even for $N_g=\frac{1}{6}$, assuming a REG multiplexing capacity of 8 PHICHs (2 from I/Q times 4 from an orthogonal sequence with $N_{SF}^{PHICH}=4$). Furthermore, if the number of PUCCH PRBs is $N_{RB}^{PUCCH}=N_{RB}^{UL}/3$, then there are more PHICH resources reserved than there are PRBs for PUSCH transmission.

To mitigate the overhead from over-dimensioning the PHICH resources, the invention considers that for multiple DL CCs, a sub-set of these DL CCs are used to provide the initial access for both legacy-UEs and advanced-UEs while the remaining DL CCs are used only after the communication link for an advanced-UE has been established. The conventional process for setting up a communication link between a UE and its serving Node B includes the UE performing a cell search for acquiring a Synchronization CHannel (SCH) transmitted by the Node B, P-BCH and S-BCH reception for obtaining system information, transmission of a Physical Random Access CHannel (PRACH) for enabling the Node B to acquire a signal from the UE, and reception of a Random Access CHannel (RACH) response assigning the parameters completing the setup. Therefore, the invention considers that channels associated with the initial establishment of the communication link, such as the SCH, P-BCH, and PRACH, are transmitted only in a sub-set of DL CCs. Once the setup is complete, the serving Node B can inform the advanced-UE through RRC signaling of a new DL/UL pair-band assignment and the advanced-UE can move its link to the assigned pair-band. In this case, the PHICH duration and $N_g$ value for PHICH transmission in the DL CC without transmission of channels associated with establishing the communication link is indicated to the advanced-UE through RRC signaling.

Figure 13:
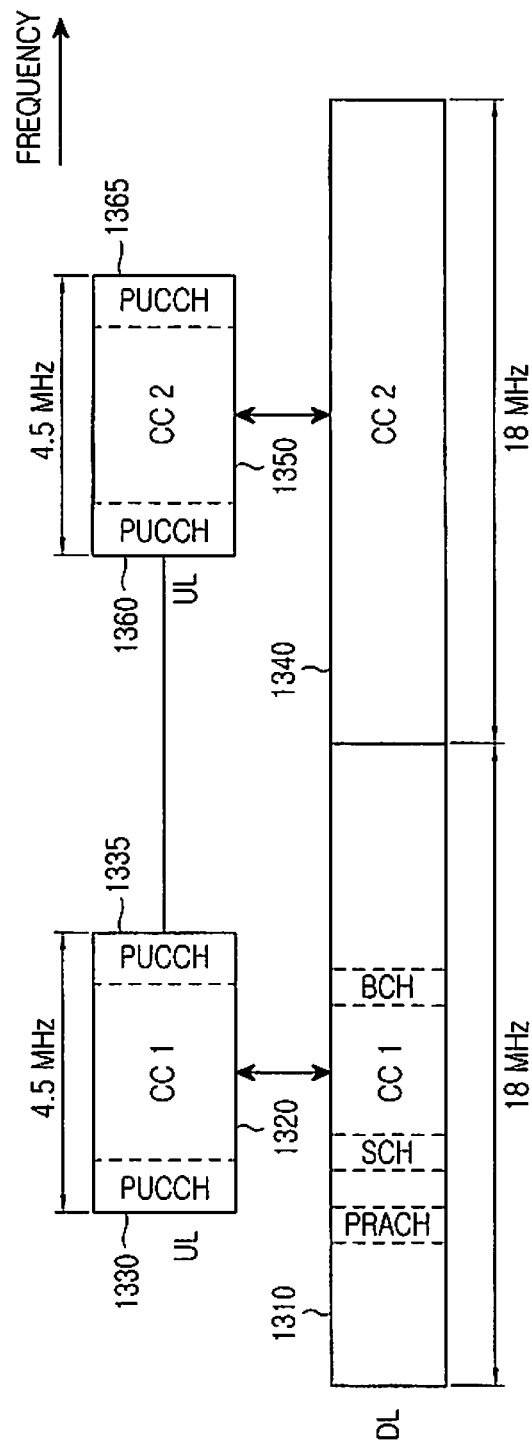
FIG. 13 is a diagram illustrating the use of a sub-set of DL CCs to establish the communication link.

By using a sub-set of DL CCs to establish the communication link, the overhead of the associated channels can be avoided in the remaining DL CCs. Moreover, additional optimizations can be performed in the remaining DL CCs as the constraints of having to support the initial communication setup are avoided. FIG. 13 further illustrates the previous principles for an exemplary configuration of 2 DL CCs of 18 MHz each, 1310 and 1340, and 2 UL CCs of 4.5 MHz each, 1320 and 1350. The PUCCH is assumed to be transmitted at the two BW edges of the UL CC1, 1330 and 1335, and UL CC2, 1360 and 1365. The communication setup is established in DL CC1 and UL CC1.

The number of PHICH groups in DL CC2 $N_{PHICH}^{group} = \lfloor N_g^{new}(N_{RB}^{UL}/8) \rfloor$ is determined based on $N_{RB}^{UL}$ for UL CC2 and $N_g^{new}$ may be additionally specified and be different than $N_g$ to reflect potentially different PHICH resource requirements in DL CC1 and DL CC2 due to, for example, different BW sizes between UL CC1 and UL CC2. The advanced-UEs may be notified of $N_{RB}^{UL}$ for UL CC2 or of $N_g^{new}$ either through an S-BCH in DL CC1 or as part of the RRC signaling performing the pair-band assignment.

The advanced-UEs may also be notified, either through an S-BCH or through RRC signaling, to exclude the PRBs used for PUCCH transmission from the determination of the PHICH resources. The PUCCH PRBs are assumed to be symmetrically placed on each side of the operating BW, as shown in FIG. 12, and their number $N_{RB}^{PUCCH}$ for each side of the operating BW is assumed to be broadcasted by the Node B. Then, the number of PHICH groups is determined as $N_{PHICH}^{group} = \lfloor N_g((N_{RB}^{UL} - 2 \cdot N_{RB}^{PUCCH})/8) \rfloor$, the PHICH group number is determined as $n_{PHICH}^{group} = (I_{PRB\_RA}^{lowest\_index} - N_{RB}^{PUCCH} + CSI) \mod N_{PHICH}^{group}$, and the orthogonal sequence index within the group is determined as $n_{PHICH}^{seq} = (\lfloor (I_{PRB\_RA}^{lowest\_index} - N_{RB}^{PUCCH})/N_{PHICH}^{group} \rfloor + CSI) \mod 2N_{SF}^{PHICH}$.

Figure 14:
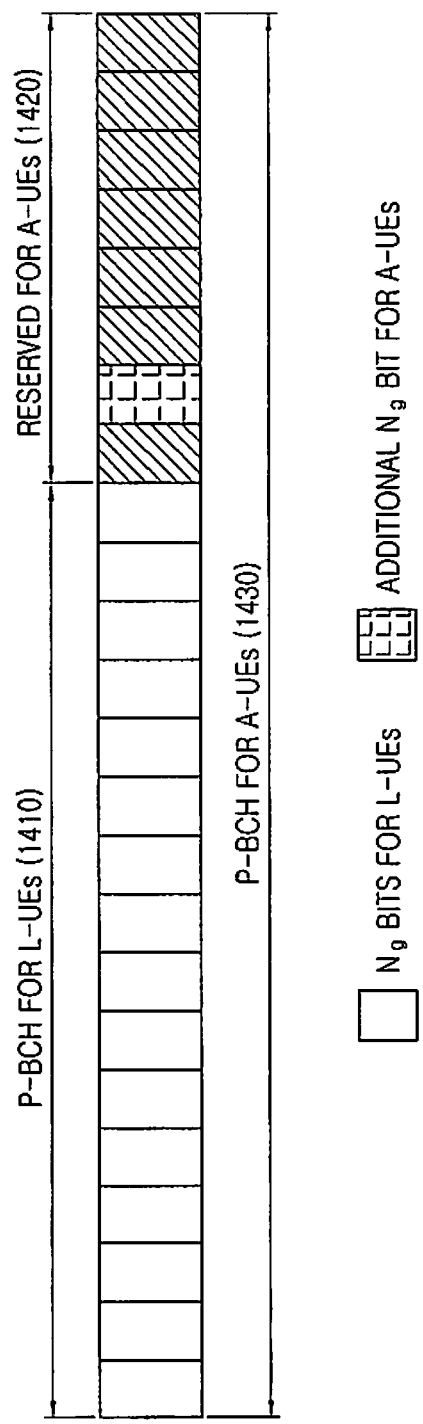
FIG. 14 is a diagram illustrating the dimensioning of PHICH resources using bits in the P-BCH that are interpreted by advanced-UEs jointly with existing bits in the P-BCH.

Alternatively, the appropriate scaling of PHICH groups may be achieved by allowing a larger range for the $N_g$ value used for advanced-UEs relative to $N_g$ value used by legacy-UEs. This can be achieved by supplementing the $N_g$ value used for legacy-UEs through the transmission of additional bits in the P-BCH. These additional bits are interpreted only by advanced-UEs. In general, assuming that from the legacy-UEs perspective the P-BCH carries reserved bits in addition to information bits, some of these reserved bits can be used to broadcast information only to advanced-UEs. For example, referring to FIG. 14, if the total number of P-BCH information bits is 24 and legacy-UEs can interpret only 16 of them 1410, the remaining 8 bits 1420 can be used to broadcast additional information only to advanced-UEs for which the P-BCH can consist of up to 24 bits 1430. For PHICH transmission, if a value of $N_g \in \{1/6, 1/2, 1, 2\}$ is signaled to legacy-UEs using 2 P-BCH bits, a value of $N_g \in \{1/18, 1/12, 1/8, 1/6, 1/2, 1, 2, 4\}$ can be signaled to advanced-UEs using 3 P-BCH bits where 2 of these bits are the same ones used to signal the $N_g$ value to legacy-UEs and the third bit is one of the reserved P-BCH bits.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for wireless communication, the method comprising:
   receiving, by a base station, two transport blocks from a user equipment;
   determining, by the base station, two resources identified by a group index and a sequence index based on an index $I_{PRB\_RA}^{lowest\_index}$, a value $I_{PRB\_RA}^{lowest\_index}+1$, and a value associated with a cyclic shift of a reference signal, the index $I_{PRB\_RA}^{lowest\_index}$ being an index of a resource for transmission of an uplink data packet, the value associated with the cyclic shift being determined based on an uplink scheduling assignment for the two transport blocks; and
   transmitting, by the base station, two acknowledgement bits associated with the received two transport blocks using the determined two resources.

2. The method of claim 1, wherein a resource for a first transport block of the two transport blocks is determined based on the index $I_{PRB\_RA}^{lowest\_index}$, and a resource for a second transport block of the two transport blocks is determined based on the value $I_{PRB\_RA}^{lowest\_index}+1$.

3. The method of claim 1, wherein a first acknowledgement bit of the two acknowledgement bits corresponds to a first transport block of the two transport blocks, and a second acknowledgement bit of the two acknowledgement bits corresponds to a second transport block of the two transport blocks.

4. The method of claim 1, wherein the index $I_{PRB\_RA}^{lowest\_index}$ denotes a lowest physical resource block (PRB) index for transmission of the uplink data packet.

5. A base station for wireless communication, the base station comprising:
   a transceiver configured to transmit and receive data; and
   a controller configured to control operations of receiving two transport blocks from a user equipment, determining two resources identified by a group index and a sequence index based on an index $I_{PRB\_RA}^{lowest\_index}$, a value $I_{PRB\_RA}^{lowest\_index}+1$, and a value associated with a cyclic shift of a reference signal, the index $I_{PRB\_RA}^{lowest\_index}$ being an index of a resource for transmission of an uplink data packet, the value associated with the cyclic shift being determined based on an uplink scheduling assignment for the two transport blocks, and transmitting two acknowledgement bits associated with the received two transport blocks using the determined two resources.

6. The base station of claim 5, wherein a resource for a first transport block of the two transport blocks is determined based on the index $I_{PRB\_RA}^{lowest\_index}$, and a resource for a second transport block of the two transport blocks is determined based on the value $I_{PRB\_RA}^{lowest\_index}+1$.

7. The base station of claim 5, wherein a first acknowledgement $I_{PRB\_RA}^{lowest\_index}$ bit of the two acknowledgement bits corresponds to a first transport block of the two transport blocks, and a second acknowledgement bit of the two acknowledgement bits corresponds to a second transport block of the two transport blocks.

8. The base station of claim 5, wherein the index $I_{PRB\_RA}^{lowest\_index}$ denotes a lowest physical resource block (PRB) index for transmission of the uplink data packet.

9. A method for wireless communication, the method comprising:
   transmitting, by a user equipment, two transport blocks to a base station;
   determining, by the user equipment, two resources identified by a group index and a sequence index based on an index $I_{PRB\_RA}^{lowest\_index}$, a value $I_{PRB\_RA}^{lowest\_index}+1$, and a value associated with a cyclic shift of a reference signal, the index $I_{PRB\_RA}^{lowest\_index}$ being an index of a resource for transmission of an uplink data packet, the value associated with the cyclic shift being determined based on an uplink scheduling assignment for the two transport blocks; and
   receiving, by the user equipment, two acknowledgement bits associated with the transmitted two transport blocks using the determined two resources.

10. The method of claim 9, wherein a resource for a first transport block of the two transport blocks is determined based on the index $I_{PRB\_RA}^{lowest\_index}$, and a resource for a second transport block of the two transport blocks is determined based on the $I_{PRB\_RA}^{lowest\_index}+1$.

11. The method of claim 9, wherein a first acknowledgement bit of the two acknowledgement bits corresponds to a first transport block of the two transport blocks, and a second acknowledgement bit of the two acknowledgement bits corresponds to a second transport block of the two transport blocks.

12. The method of claim 9, wherein the index $I_{PRB\_RA}^{lowest\_index}$ denotes a lowest physical resource block (PRB) index for transmission of the uplink data packet.

13. A user equipment for wireless communication, the user equipment comprising:
  a transceiver configured to transmit and receive data; and
  a controller configured to control operations of transmitting two transport blocks to a base station, determining two resources identified by a group index and a sequence index based on an index $I_{PRB\_RA}^{lowest\_index}$, a value $I_{PRB\_RA}^{lowest\_index}+1$, and a value associated with a cyclic shift of a reference signal, the index $I_{PRB\_RA}^{lowest\_index}$ being an index of a resource for transmission of an uplink data packet, the value associated with the cyclic shift being determined based on an uplink scheduling assignment for the two transport blocks, and receiving two acknowledgement bits associated with the transmitted two transport blocks using the determined two resources.

14. The user equipment of claim 13, wherein a resource for a first transport block of the two transport blocks is determined based on the index $I_{PRB\_RA}^{lowest\_index}$, and a resource for a second transport block of the two transport blocks is determined based on the value $I_{PRB\_RA}^{lowest\_index}+1$.

15. The user equipment of claim 13, wherein a first acknowledgement bit of the two acknowledgement corresponds to a first transport block of the two transport blocks, and a second acknowledgement bit of the two acknowledgement bits corresponds to a second transport block of the two transport blocks.

16. The user equipment of claim 13, wherein the index $I_{PRB\_RA}^{lowest\_index}$ denotes a lowest physical resource block (PRB) index for transmission of the uplink data packet.

* * * * *

UNITED STATES PATENT AND TRADEMARK OFFICE
CERTIFICATE OF CORRECTION

PATENT NO. : 9,918,301 B2
APPLICATION NO. : 14/810198
DATED : March 13, 2018
INVENTOR(S) : Aris Papasakellariou et al.

Page 1 of 1

It is certified that error appears in the above-identified patent and that said Letters Patent is hereby corrected as shown below:

In the Claims

In Column 14, Claim 7, Line 2:
"edgement $I_{PRB\_RA}^{lowest\_index}$ bit of the two acknowledge-"
Should be:
-- edgement bit of the two acknowledge- --

In Column 15, Claim 10, Line 2:
"mind based on the $I_{PRB\_RA}^{lowest\_index} +1$.,"
Should be:
-- mind based on the value $I_{PRB\_RA}^{lowest\_index} +1$. --

Signed and Sealed this
Fifteenth Day of January, 2019

Andrei Iancu
*Director of the United States Patent and Trademark Office*